United States Patent [19]

Collins, Jr.

[11] Patent Number: 5,019,694

[45] Date of Patent: May 28, 1991

[54] OVERHEAD SCANNING TERMINAL

[75] Inventor: Donald A. Collins, Jr., Ithaca, N.Y.

[73] Assignee: NCR Corporation, Dayton, Ohio

[21] Appl. No.: 414,809

[22] Filed: Sep. 29, 1989

[51] Int. Cl.⁵ ............................................. G06K 15/00
[52] U.S. Cl. .................................... 235/383; 235/462; 235/470
[58] Field of Search ................ 235/383, 462, 467, 470

[56] References Cited

U.S. PATENT DOCUMENTS

| | | | |
|---|---|---|---|
| 3,059,112 | 10/1962 | Rogal | 235/383 X |
| 3,169,186 | 2/1965 | Howard | 235/470 X |
| 3,728,677 | 4/1973 | Munson | 340/146.3 F |
| 3,774,014 | 11/1973 | Berler | 235/467 |
| 4,369,361 | 1/1983 | Swartz et al. | 235/470 |
| 4,493,038 | 1/1985 | Bovio et al. | 364/405 |
| 4,676,343 | 6/1987 | Humble et al. | 186/61 |
| 4,684,935 | 8/1987 | Fujisaku et al. | 340/717 |
| 4,689,490 | 8/1987 | Thomas et al. | 250/566 |
| 4,775,782 | 10/1988 | Mergenthaler et al. | 235/470 X |

*Primary Examiner*—David Trafton
*Attorney, Agent, or Firm*—Wilbert Hawk, Jr.; Albert L. Sessler, Jr.; Richard W. Lavin

[57] ABSTRACT

An overhead bar code scanning system is supported by a checkout counter and includes an overhanging portion to which is secured a plurality of scanning units orientated towards the counter to scan a coded label on a merchandise item moved under the scanning units. Mounted in the overhanging portion are a pair of display members, a pair of keyboard members, a printer and a magnetic stripe reader for use by the operator and the customer to process the purchased merchandise items.

7 Claims, 4 Drawing Sheets

OVERHEAD SCANNING TERMINAL

CROSS-REFERENCE TO RELATED APPLICATIONS

Reference is hereby made to U.S. Pat. No. 4,971,410 issued Nov. 20, 1990 and assigned to the assignee of the present invention.

U.S. patent application Ser. No. 414,808 filed Sept. 29, 1989 and assigned to the assignee of the present invention.

BACKGROUND OF THE INVENTION

The invention relates to checkout systems and more particularly to a data terminal device for use in a checkout operation which includes an optical scanning system.

In present-day merchandising point-of-sale operations, data pertaining to the purchase of a merchandise item is obtained by reading data encoded indicia such as a bar code label printed on or attached to the merchandise item. Scanning systems which have been constructed to read bar code labels include hand-held wands which are moved across the label and stationary optical scanning systems normally located within the checkout counter in which the coded label is moved across a window in the surface of the counter constituting the scanning area of the counter, which movement is part of the process for loading the item in a baggage cart. The checkout operation is completed by the issuing of a purchase receipt and the payment of the amount due for the purchased merchandise items. It has been found that such a checkout arrangement does not lend itself to processing a large number of customers during rush hours.

SUMMARY OF THE INVENTION

An overhead bar code scanning system is provided which comprises a post member having a curved overhead scanning head portion adjacent to both the operator and the customer and from which depends a plurality of optical scanning units which are orientated to cover a large scanning area eliminating any problems with respect to aligning the coded label with the scanning unit. Each of the scanning units has a different fixed depth of focus. Included in the head portion adjacent the customer is a display for displaying the price of the item purchased as well as leadthrough information, a keyboard for use by the customer to insert a secret code and other information needed to pay for the purchased items, a magnetic stripe reader to facilitate payment by the customer using a credit/debit card and a printer which prints a customer's receipt. The head portion also provides a writing surface for use by the customer in writing a check. Included in the head portion adjacent the operator is a display for displaying item information and leadthrough information for normal item entry and finalization activity and a keyboard for data entry.

It is thus an object of this invention to provide a checkout system which enables the checkout operation to occur in the fastest time possible.

It is another object of this invention to provide a checkout system having a scanning system which scans a broad scanning area through which a coded label is moved.

It is a further object of this invention to provide a checkout system which has all the checkout equipment within reach of the operator and the customer without requiring them to turn around enabling the checkout operation to occur in the minimum amount of time.

BRIEF DESCRIPTION OF THE DRAWINGS

These and other objects, features and advantages of the invention, as well as the invention itself, will become more apparent to those skilled in the art in light of the following detailed description taken in consideration with the accompanying drawing wherein like reference numerals indicate like or corresponding parts throughout the several views in which.

DESCRIPTION OF THE PREFERRED EMBODIMENT

Figure 1:
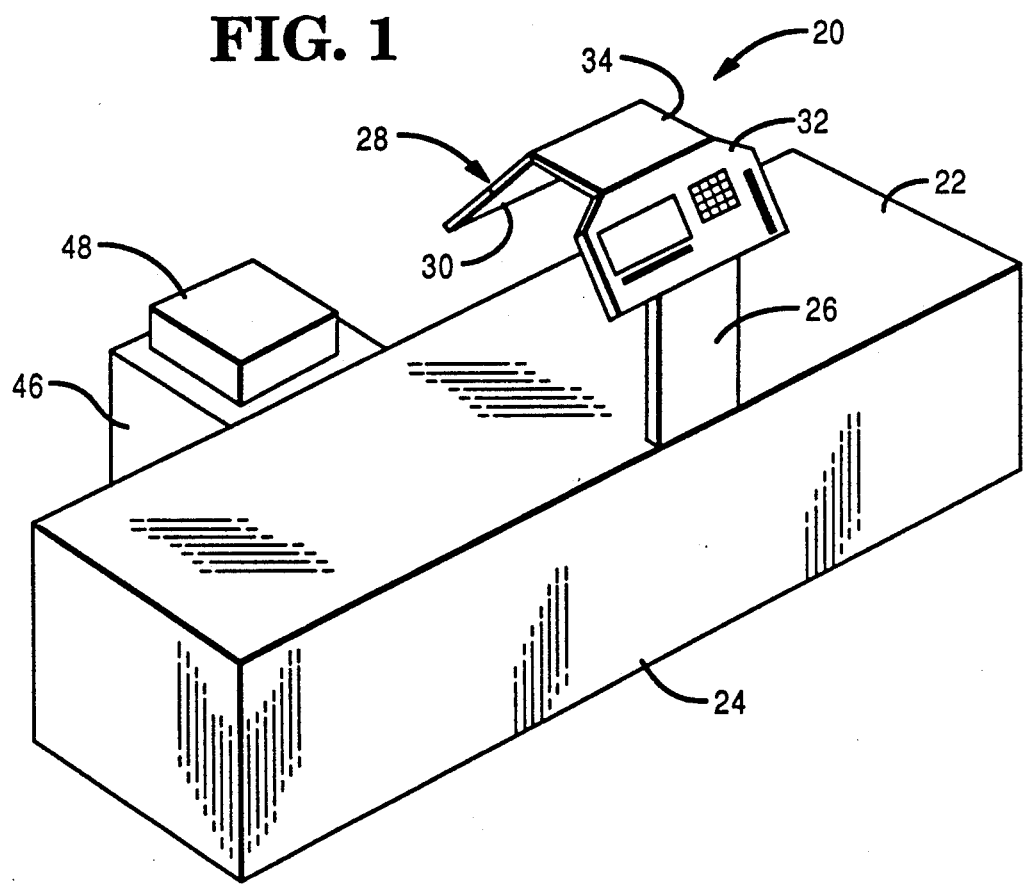
FIG. 1 is a perspective view of the checkout system of the present invention.
Figure 2:
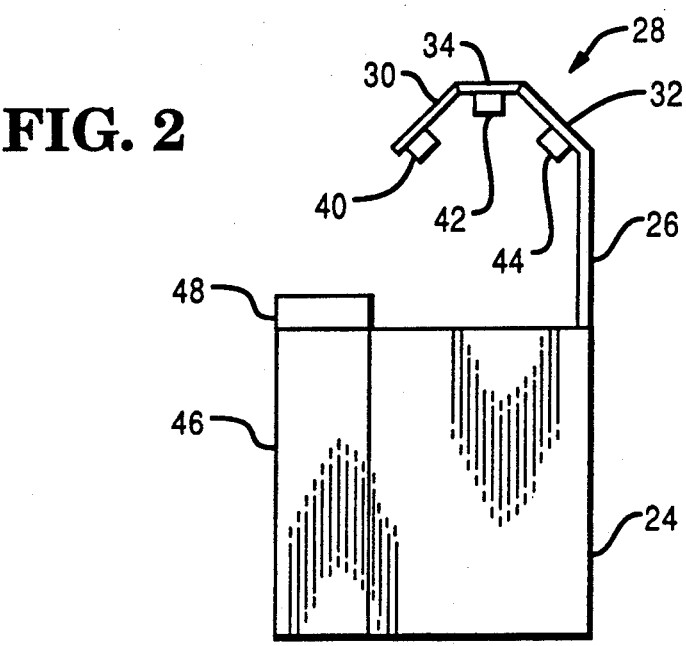
FIG. 2 is a reduced end view of the checkout system of the present invention showing the curved overhead scanning head portion and the orientation of the scanning units.
Figure 6:
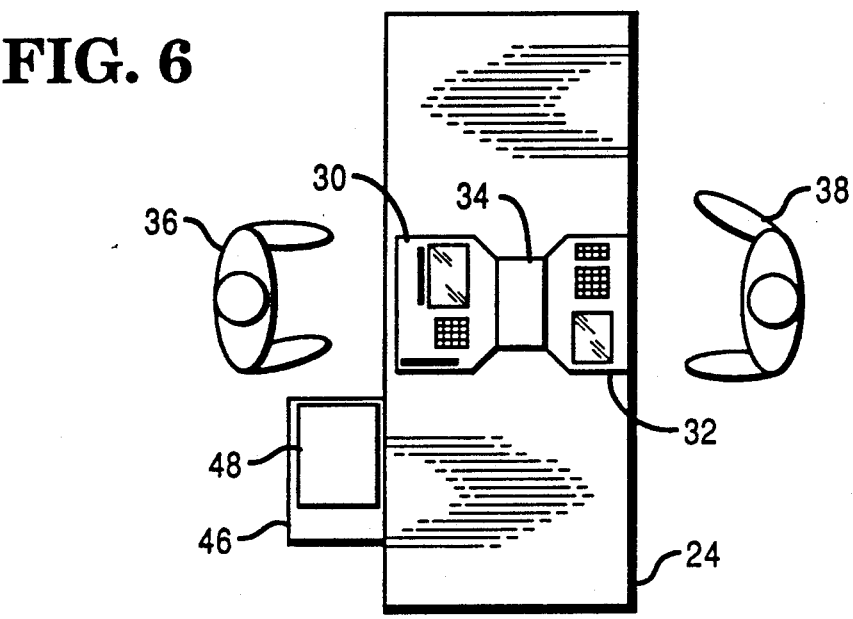
FIG. 6 is a top view of the scanning system of the present invention showing the location of the operator and the customer adjacent the overhead scanning head portion.

Referring now to the drawings, FIG. 1 is a perspective view of the checkout system of the present invention which includes an overhead bar code scanning unit generally indicated by the numeral 20 mounted to the top surface 22 of a checkout counter 24. The scanning unit includes a post portion 26 supporting a curved scanning head portion generally indicated by the numeral 28 which extends crosswise over the surface 22 of the counter 24 (FIG. 2). As best seen in FIG. 2, the head portion 28 comprises two inclined portions 30, 32 and a horizontal portion 34. As shown in FIG. 6, the inclined portion 30 is positioned adjacent the operator 36 while the inclined portion 32 is positioned adjacent the customer 38. Depending from the head portion 28 are a plurality of optical scanning units 40-44 inclusive for projecting a scanning light beam in a manner that is well known in the art. The scanning units are orientated to cover a wide scanning area to scan a coded label on a purchased merchandise item positioned by the checkout operator adjacent the scanning units. The scanning units may be constructed so that each scanning unit focuses the scanning light beams at a different focal plane providing a scanning area depth. Located on a support member 46 adjacent the counter 24 is a cash till 48 for use by the checkout operator in finalizing the checkout operation.

Figure 3:
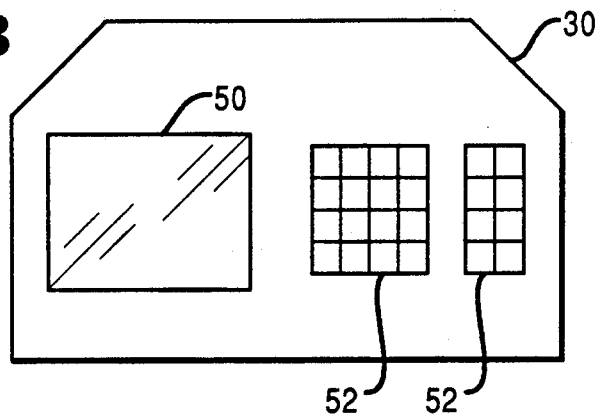
FIG. 3 is a plan view of a portion of the scanning head portion showing the location of the operator's display and keyboard.
Figure 4:
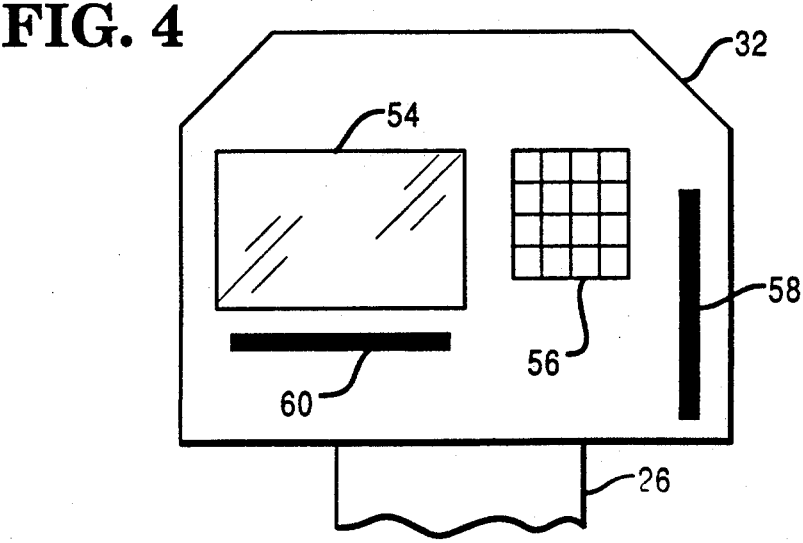
FIG. 4 is a plan view of a portion of the scanning head portion showing the location of the customer's display, keyboard and magnetic stripe reader and the printer slot through which the customer's receipt is issued.

Referring to FIGS. 3 and 4, there are shown plan views of the inclined portions 30 and 32, respectively. Included in the portion 30 is the operator's display 50 which is used for normal item entry operations including the displaying of the price of the purchased merchandise item and leadthrough information used in finalizing the checkout operation. The inclined portion 30 also includes a keyboard 52 for entering data identifying the purchased merchandise item when the scanning units 40-44 inclusive fail to read the coded label on the merchandise item. The inclined portion 32 (FIG. 4) includes a customer's display 54 which displays items such as the price of the purchased merchandise item together with leadthrough information with respect to the payment of the merchandise items as will be described hereinafter. The inclined portion 32 further includes a keyboard 56 used to input data identifying the customer, a slot 58 which accepts a credit/debit magnetic stripe card for use in paying for the purchased items and a printer slot 60 which accepts a blank customer's check for printing the amount due for the purchased merchandise items and the name of the payee. The check is returned through the slot to the customer, who then signs the check and writes in the amount due. The display 54 leads the customer through this operation. The horizontal portion 34 of the scanning head portion 28 may be used by the customer to write on the check.

Figure 5:
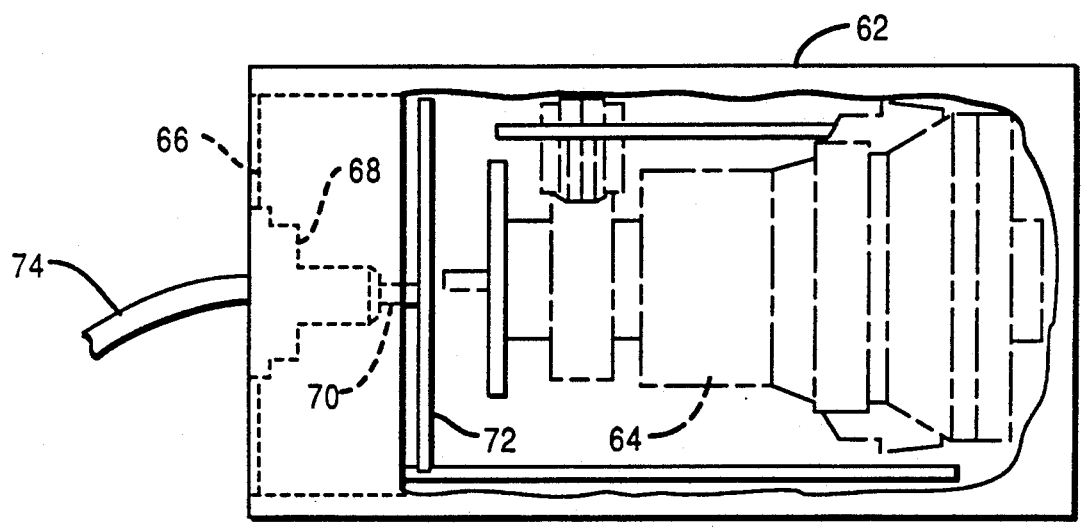
FIG. 5 is a partial detailed view of one of the scanning units employed in the present invention.

Referring now to FIG. 5, there is shown a side view of one of the scanning units 40-44 inclusive whose construction is fully disclosed in the previously cited patent applications Ser. No. 386,377 now U.S. Pat. No. 4,971,410, Ser. No. 414,808, which applications are fully incorporated herein by reference. The scanning units comprise an elongated hollow casing member 62 within which is mounted a compact scanning unit 64 whose construction is fully disclosed in the previously cited patent application S.N. 386,377 ., now U.S. Pat. No. 4,971,410. Mounted to the rear wall portion 66 is an electrical plug member 68 having a connecting cable 70 coupled to a printed circuit board 72 for supplying power to the scanning unit. A power cable 74 is attached to the plug member 68. As shown in FIG. 2, each of the scanning units 40-44 inclusive is mounted perpendicular to the underside of the portions 30-34 inclusive to scan a coded label orientated in a vertical or horizontal position. As fully disclosed in the previously cited patent application Ser. No. 414,808, the scanning units may be constructed with the casing member 62 having an annular bearing member (not shown) mounted in a socket enabling the scanning unit to be manually rotated to a plurality of scanning positions by the operator enabling various size packages to be scanned.

Figure 7:
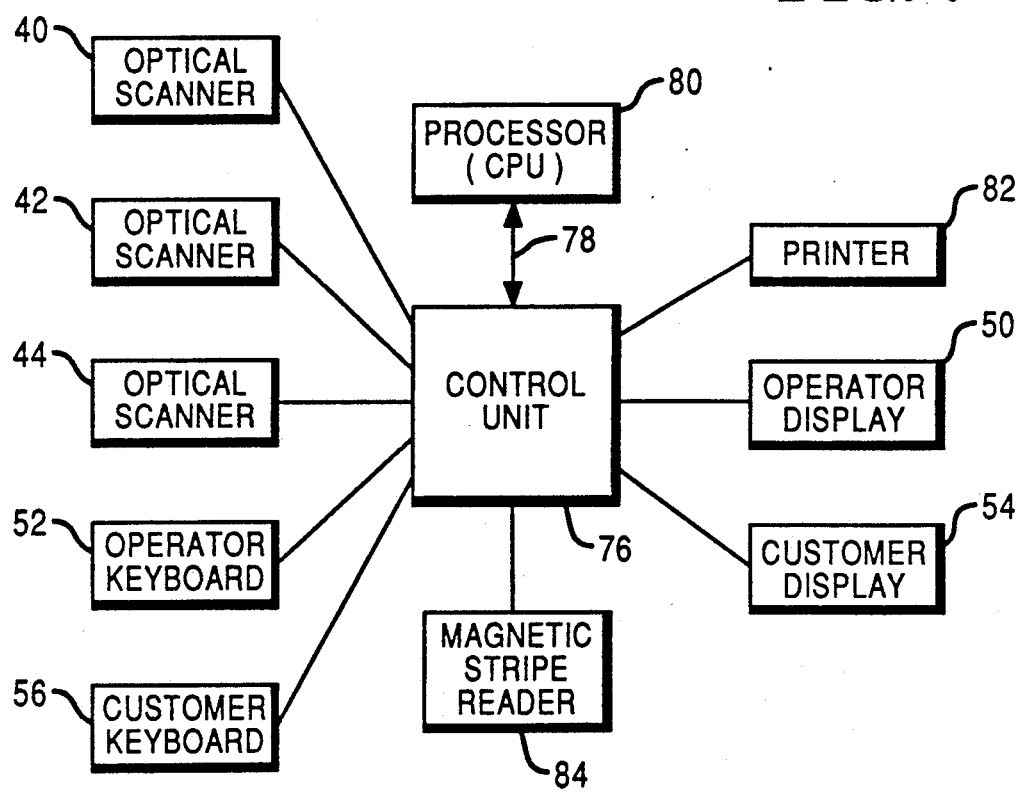
FIG. 7 is a block diagram of the checkout system of the present invention.

Referring now to FIG. 7, there is shown a block diagram of the checkout system of the present invention which includes a control unit 76 normally located in the checkout counter 24. The control unit is coupled over line 78 to a remote processor 80 in which is located price-lookup tables. Coupled to the control unit are the optical scanners 40-44 inclusive, the keyboards 52 and 56, the displays 50 and 54, a printer 82 and a magnetic stripe card reader 84. The control unit 76, in addition to controlling the operation of the processing devices, synchronizes the operation of the scanning units 40-44 inclusive so that the reflected light from the scanned label generated as a result of the operation of one of the scanning units will not be detected by another of the scanning units.

In the operation of the checkout system, the operator will move the purchased merchandise item under the scanning units 40-44 inclusive (FIG. 2) enabling the scanning units to read the coded label attached to the item. Because of the orientation to the scanning units, the coded label can be located in any position to enable the scanning units to read the label. The data read on the label is transferred to the control unit 76 where the data is decoded and the information is transmitted to the processor 80. The processor using the received data retrieves the price of the merchandise item from the lookup tables and transmits the price to the control unit 76 which operates the displays 50, 54 to display the price to the customer and the operator. If the scanning units 40-44 inclusive fail to read the coded label, the operator will enter the data read from the label using the keyboard.

At the conclusion of the checkout operation, the control unit 76 will operate the displays 50 and 54 to display the total amount due. The customer at this time will actuate one of several control keys (not shown) on the keyboard 56 indicating the method of payment as a result of leadthrough instructions appearing on the display 54. The customer may pay by cash, by credit card or by check. If payment is to be made by credit card, the display 54 will prompt the customer to move the credit card through the slot 58 (FIG. 4) enabling the reader 84 (FIG. 7) to read the required information. The printer 82 (FIG. 7) will print the required data on a receipt record member (not shown) and deliver the record member through the slot 60 to the customer.

If the customer is to pay by check, the control unit 76 (FIG. 7) will operate the customer's display 54 to prompt the customer to insert a blank check in the slot 60. Upon insertion of the check, the printer 82 will print the amount due, the date and the name of the payee. The check is then returned to the customer. Using the horizontal portion 34 of the overhead scanning unit 20 (FIG. 2) as a writing surface, the customer will write in the amount due and sign the check. After receiving the check, the operator will actuate a key on the keyboard enabling the printer 82 to issue the receipt record member through the slot 60 (FIG. 4) to the customer.

It will be seen that the checkout system of the present invention overcomes the delays normally found in present day checkout systems. Mounting a plurality of individual scanning units in a overhanging structure reduces the chance of misreading the bar code label when positioning the label in a reading position. Locating the keyboards and the displays in positions which face the operator and the customer when they are in their normal position during the checkout operation reduces the time required to finalize the checkout operation.

While the principles of the invention have now been made clear in an illustrated embodiment, it will be obvious to those skilled in the art that many modifications of structure, arrangements and components can be made which are particularly adapted for specific environments and operating requirements without departing from those principles. The appended claims are therefore intended to cover and embrace any such modifications, within the limits only of the true spirit and scope of the invention.

What is claimed is:
1. A checkout system comprising;
   a checkout counter having a supporting surface for supporting purchased merchandise items, said supporting surface having an operator's side and a customer's side;
   a support member mounted to said checkout counter having a head portion overhanging the supporting surface, said head portion having a first inclined portion located adjacent the operator's side of the checkout counter and a second inclined portion located adjacent the customer's side of the checkout counter;

a plurality of scanning units secured to the head portion and extending in a downward direction towards said supporting surface for scanning a coded label on a purchased merchandise item moved under the scanning units; and display means mounted in said first and second inclined portions for displaying the price of the scanned merchandise item to an operator and a customer.

2. The checkout system of claim 1 which further includes a first keyboard member mounted in said first inclined portion enabling the operator to enter data pertaining to the merchandise item and a second keyboard member mounted in the second inclined portion enabling the customer to pay for the merchandise items.

3. The checkout system of claim 1 which further includes a magnetic stripe card reader mounted in said second inclined portion for reading a magnetic stripe card inserted in the reader by the customer as payment for the purchased merchandise items.

4. The checkout system of claim 1 which further includes a printer mounted in said second inclined portion for issuing a receipt record to the customer containing data pertaining to the cost of the purchased merchandise items.

5. The checkout system of claim 1 in which each of the scanning units are orientated at a different angle to supporting surface of the counter.

6. The checkout system of claim 1 in which each of the scanning units focuses the projecting light beams at a different focal plane.

7. The checkout system of claim 6 which further includes a control member for controlling the operation of said keyboard members, display means, card reader, printer and scanning units, said control member synchronizing the operation of the scanning units preventing operation of one of the scanning units from interfering with the operation of another of the scanning units.

* * * * *